US008335341B2

(12) United States Patent
Rudeen et al.

(10) Patent No.: US 8,335,341 B2
(45) Date of Patent: Dec. 18, 2012

(54) COMPENSATED VIRTUAL SCAN LINES

(75) Inventors: Robert William Rudeen, Eugene, OR (US); WenLiang Gao, Eugene, OR (US); Bryan L. Olmstead, Eugene, OR (US)

(73) Assignee: Datalogic ADC, Inc., Eugene, OR (US)

( * ) Notice: Subject to any disclaimer, the term of this patent is extended or adjusted under 35 U.S.C. 154(b) by 1139 days.

(21) Appl. No.: 12/205,604

(22) Filed: Sep. 5, 2008

(65) Prior Publication Data

US 2009/0067731 A1  Mar. 12, 2009

Related U.S. Application Data

(60) Provisional application No. 60/970,763, filed on Sep. 7, 2007.

(51) Int. Cl.
G06K 9/00 (2006.01)
G06K 9/36 (2006.01)
G06K 7/10 (2006.01)

(52) U.S. Cl. .................... 382/100; 382/232; 235/462.41

(58) Field of Classification Search .................. None
See application file for complete search history.

(56) References Cited

U.S. PATENT DOCUMENTS

| | | | | |
|---|---|---|---|---|
| 3,381,274 A * | 4/1968 | Quade et al. | .................. | 382/193 |
| 4,298,944 A * | 11/1981 | Stoub et al. | .................. | 382/274 |
| 4,588,882 A * | 5/1986 | Buxton | .................. | 235/487 |
| 4,694,164 A * | 9/1987 | Noguchi | .................. | 250/234 |
| 4,868,670 A * | 9/1989 | Morton et al. | .................. | 358/447 |
| 5,126,544 A * | 6/1992 | Izumi | .................. | 235/462.1 |
| 5,155,343 A * | 10/1992 | Chandler et al. | .................. | 235/462.09 |
| 5,243,655 A * | 9/1993 | Wang | .................. | 380/51 |
| 5,258,605 A * | 11/1993 | Metlitsky et al. | .................. | 235/462.32 |
| 5,296,690 A * | 3/1994 | Chandler et al. | .................. | 235/462.1 |
| 5,304,787 A * | 4/1994 | Wang | .................. | 235/462.09 |
| 5,319,181 A * | 6/1994 | Shellhammer et al. | .. | 235/462.09 |
| 5,343,028 A * | 8/1994 | Figarella et al. | .................. | 235/462.09 |
| 5,378,881 A * | 1/1995 | Adachi | .................. | 235/462.09 |
| 5,384,453 A * | 1/1995 | Peng | .................. | 235/462.38 |
| 5,446,271 A * | 8/1995 | Cherry et al. | .................. | 235/462.1 |
| 5,469,267 A * | 11/1995 | Wang | .................. | 358/3.21 |
| 5,635,699 A * | 6/1997 | Cherry et al. | .................. | 235/462.41 |
| 5,811,776 A | 9/1998 | Liu | | |
| 5,854,478 A | 12/1998 | Liu et al. | | |
| 5,929,421 A | 7/1999 | Cherry et al. | | |
| 5,932,862 A | 8/1999 | Hussey et al. | | |
| 5,949,922 A * | 9/1999 | Wada et al. | .................. | 382/295 |
| 5,992,753 A | 11/1999 | Xu | | |
| 6,053,413 A | 4/2000 | Swift et al. | | |
| 6,064,763 A * | 5/2000 | Maltsev | .................. | 382/183 |
| 6,128,414 A | 10/2000 | Liu | | |
| 6,142,376 A * | 11/2000 | Cherry et al. | .................. | 235/462.14 |
| 6,179,208 B1 | 1/2001 | Feng | | |

(Continued)

*Primary Examiner* — Manav Seth
(74) *Attorney, Agent, or Firm* — Stoel Rives LLP

(57) ABSTRACT

Disclosed are embodiments of methods, systems, and apparatus for providing virtual scan lines in an imaging system that compensate for the optical distortion associated with the system. In some embodiments, the virtual scan lines may be curved or angled according to their position in the Field of View (FOV) of the imaging system to compensate for the distortion. Some embodiments may provide for virtual scan lines that are preconfigured to compensate for a typical or pre-selected level and type of optical distortion. Other embodiments may be configured to measure or otherwise ascertain the actual distortion of the optical lens and/or other components of the system and generate a virtual scan line pattern that compensates for the measured distortion.

30 Claims, 3 Drawing Sheets

U.S. PATENT DOCUMENTS

| | | | |
|---|---|---|---|
| 6,340,119 B2 | 1/2002 | He et al. | |
| 6,722,566 B1 | 4/2004 | Drzymak et al. | |
| 6,732,929 B2 | 5/2004 | Good et al. | |
| 6,778,683 B1 | 8/2004 | Bonner et al. | |
| 6,802,452 B2 | 10/2004 | Lebaschi et al. | |
| 6,830,185 B2 | 12/2004 | Tsikos et al. | |
| 6,961,456 B2 | 11/2005 | Bonner et al. | |
| 6,969,003 B2 | 11/2005 | Havens et al. | |
| 7,007,843 B2 | 3/2006 | Poloniewicz | |
| 7,007,848 B2 | 3/2006 | Li | |
| 7,059,525 B2 | 6/2006 | Longacre et al. | |
| 7,075,687 B2 | 7/2006 | Lippert et al. | |
| 7,146,036 B2 * | 12/2006 | An Chang et al. | 382/154 |
| 7,260,813 B2 * | 8/2007 | Du et al. | 716/51 |
| 7,533,822 B2 * | 5/2009 | Oliva et al. | 235/462.36 |
| 7,704,652 B2 * | 4/2010 | Hatai | 430/22 |
| 7,823,786 B2 * | 11/2010 | Oliva et al. | 235/462.36 |
| 7,924,349 B2 * | 4/2011 | Tan et al. | 348/744 |
| 8,091,788 B2 * | 1/2012 | Olmstead | 235/462.41 |
| 2003/0024987 A1 * | 2/2003 | Zhu | 235/454 |
| 2003/0042315 A1 * | 3/2003 | Tsikos et al. | 235/472.01 |
| 2004/0004128 A1 | 1/2004 | Pettinelli et al. | |
| 2005/0077358 A1 | 4/2005 | Boehm et al. | |
| 2006/0027657 A1 | 2/2006 | Ninnink et al. | |
| 2006/0065732 A1 | 3/2006 | Barkan | |
| 2006/0081712 A1 | 4/2006 | Rudeen et al. | |
| 2006/0278708 A1 | 12/2006 | Olmstead | |
| 2007/0064211 A1 * | 3/2007 | Hatai | 355/55 |

* cited by examiner

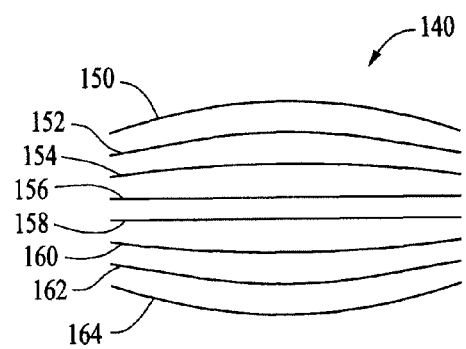
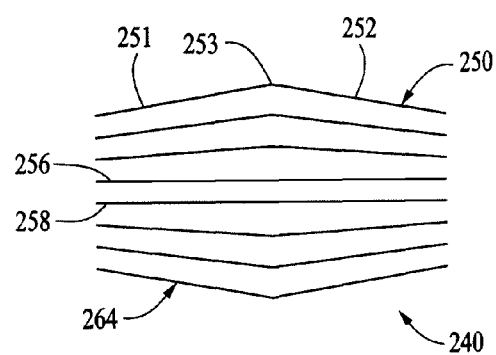
FIG. 3A  FIG. 3B
FIG. 4
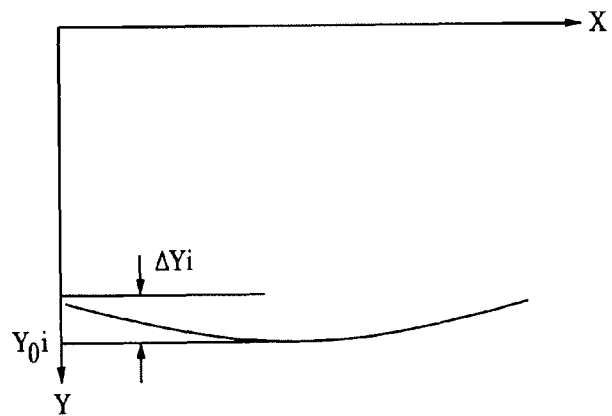

COMPENSATED VIRTUAL SCAN LINES

RELATED APPLICATION DATA

This application claims the benefit under 35 U.S.C. §119 (e) of U.S. Provisional Patent Application No. 60/970,763, filed Sep. 7, 2007, and titled "Compensated Virtual Scan Lines," hereby incorporated by reference.

BACKGROUND

The field of the present disclosure relates generally but not exclusively to optical code readers and, in a preferred application, it relates to systems, methods, and apparatus for generating virtual scan lines that compensate for the distortion in an imaging system for reading encoded symbols.

Imaging systems employing virtual scan lines have been proposed to provide a method for reading encoded symbols, such as barcode labels, by making efficient use of scanned input area. Some virtual scan line systems employ a raster line input. In one such system, input data may be provided by an area sensor, such as a two dimensional charge-coupled device (CCD) or complementary metal oxide semiconductor (CMOS) array or a video tube. In systems with a single line sensor (such as a single line CCD or a single line laser scanner) movement of the item by an operator or an additional transverse scanning mechanism, for example, may provide for the second axis of the raster scan. Preferably, not all of the scanned data, but only a select portion of the data corresponding to predefined virtual scan lines, is stored and processed.

The virtual scan line pattern may be defined based on the dimensions of barcode labels to be scanned, the size of the scanning area, and/or the characteristics of the scanning sensor and optics. The virtual scan lines are typically mapped onto the raster pattern, thereby allowing the pixels of the raster which fall on the virtual scan lines to be identified. As the raster scan proceeds, information regarding the intensity of the detected light is stored only for the pixels included in the virtual scan lines. The amount of data stored is therefore a fraction of the total data in the raster.

After the pixel values corresponding to the virtual scan line(s) have been stored, the edges of the bars and spaces crossed by the virtual scan line(s) may be determined by a suitable analog or digital edge detection method. Because only selected pixels from the sensor are processed, throughput is increased, which allows for the use of more sophisticated signal processing methods. The data can also be decoded by a decoder, which may use the scan line boundaries within the data stream to facilitate decoding. Further detail regarding the use of virtual scan lines can be found in U.S. Pat. No. 6,142,376, titled "Method and Apparatus for Reading Symbols on Items Moved by Conveyor," U.S. Patent Application Publication No. 2006/0278708, filed Apr. 11, 2006 and titled "System and Method for Data Reading Using Raster Scanning," and U.S. Patent Application Publication No. 2006/0081712, filed Oct. 17, 2005 and titled "System and Method of Optical Reading Employing Virtual Scan Lines." Each of the aforementioned patent documents is hereby incorporated by reference in its entirety.

The present inventor has recognized that the effectiveness of an imaging system employing virtual scan lines may often be limited by optical distortion inherent in the optical components of an imaging system. Such optical distortion may be particularly problematic in reading bar codes or other encoded symbols with small row heights, such as, for example, the PDF417 bar code. Optical distortion may, in some circumstances, cause virtual scan lines which form a straight line trajectory to fail to intercept the entire row of the code and thereby prevent an accurate read.

For example, as shown in FIG. 1, optical distortion in an imaging system may cause an image of a bar code 10 to bow or curve near the right and left ends of the image. Accordingly, virtual scan line 50, which runs horizontally across the bottom of the image shown in FIG. 1, misses the start and stop columns of the bar code 10. Likewise, virtual scan line 60, which runs horizontally across the top of the image, misses the start and stop columns. Bar code 10 is therefore not decodable by virtual scan line 50, nor by virtual scan line 60.

The present inventor has therefore determined that it would be desirable to compensate for the distortion in the optical components of an imaging system so as to improve upon these and/or other limitations.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which:

FIG. 3A depicts an example of a pattern of compensated virtual scan lines.

FIG. 3B depicts another example of a pattern of compensated virtual scan lines.

FIG. 4 depicts a plot with dimensions used to calculate and plot pixels on an image to create a compensated virtual scan line.

DETAILED DESCRIPTION OF THE PREFERRED EMBODIMENTS

Figure 1:
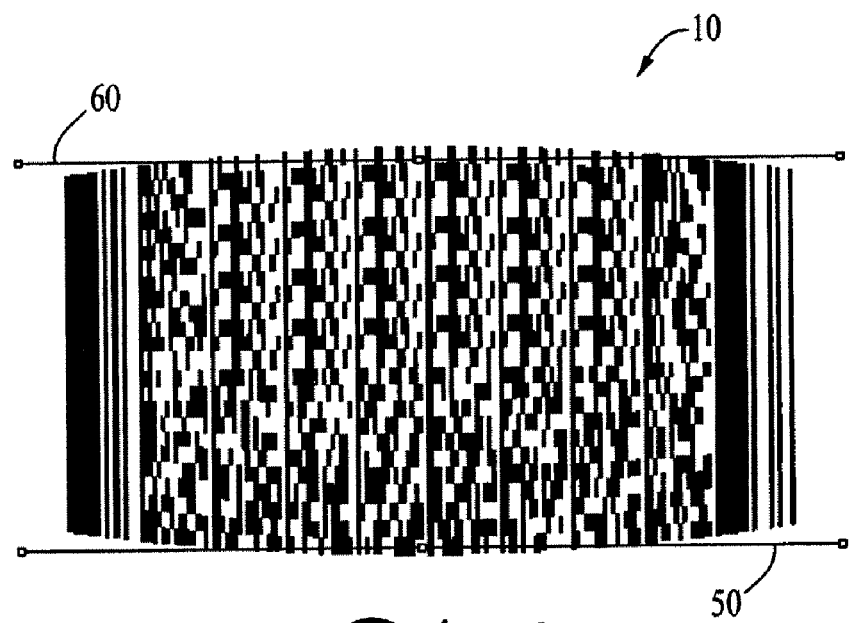
FIG. 1 depicts a distorted image of a bar code and a straight, horizontal virtual scan line positioned along a portion of the bar code.

In the following description, numerous specific details are provided for a thorough understanding of specific preferred embodiments. However, those skilled in the art will recognize that embodiments can be practiced without one or more of the specific details, or with other methods, components, materials, etc.

In some cases, well-known structures, materials, or operations are not shown or described in detail in order to avoid obscuring aspects of the preferred embodiments. Furthermore, the described features, structures, or characteristics may be combined in any suitable manner in one or more embodiments.

Disclosed herein are embodiments of methods, systems, and apparatus for providing virtual scan lines in an imaging system that compensate for the optical distortion associated with the system. In some embodiments, the virtual scan lines may be curved or angled according to their position in the Field of View (FOV) of the imaging system to compensate for the distortion. In other words, if the optical distortion inherent to the system results in an image that bows towards the ends of the image, straight virtual scan lines may be replaced with curved and/or segmented virtual scan lines that tend to follow the curvature caused by the distortion.

Some embodiments may provide for virtual scan lines that are preconfigured to compensate for a typical or pre-selected level and type of optical distortion. In such embodiments, the virtual scan line patterns may be hard-coded into the system.

Alternatively, other embodiments may be configured to measure or otherwise ascertain the actual distortion of the optical lens and/or other components of the system. In such embodiments, virtual scan lines may be created on the fly that compensate for the measured distortion. In some such embodiments, the system may be configured to receive feedback data from the image of the barcode and alter the curvature, shape, and/or configuration of the virtual scan lines based upon the feedback data.

The virtual scan lines may be configured to compensate for optical distortion in a number of different ways. For example, in some embodiments, the virtual scan lines may be curved in accordance with the distortion of the imaging system, or in accordance with a typical or expected distortion. The curvature may, for example, be patterned from a quadratic equation or equations. These equations may be, for example, hard-coded into the system or generated by software provided with the system. In other embodiments, the compensated virtual scan lines may each comprise a plurality of straight lines which are joined and converge at one or more common points so as to define an angle or a plurality of angles therebetween.

In one example of a method according to one implementation, a compensated virtual scan line pattern is generated to at least partially compensate for distortion in an optical imaging system. An encoded symbol is then imaged with the optical imaging system. Data from the encoded symbol image corresponding to pixels defined by the compensated virtual scan line pattern is then stored to read the encoded symbol.

In one example of a system according to another embodiment, an optical sensor is provided with a virtual scan line pattern generator. The virtual scan line pattern generator may be configured for defining a compensated virtual scan line pattern to at least partially compensate for optical distortion associated with the system. A processing device, such as a storage device, may also be included for processing data received from the optical sensor corresponding to pixels that overlap with the compensated virtual scan line pattern.

In some embodiments, the systems and/or methods described above may also include an optical distortion measurement component that is configured to measure the optical distortion associated with an image generated from the optical sensor. The optical distortion measurement component may, in some embodiments, be further configured to transfer distortion data to the virtual scan line pattern generator. The virtual scan line pattern generator may then use the distortion data to define the compensated virtual scan line pattern.

The virtual scan line pattern generator may also be configured to alter the compensated virtual scan line pattern "on the fly" in response to distortion data received from the optical distortion measurement component. For example, the type of distortion and/or the level of distortion detected by the optical distortion measurement component may be used to alter/define the compensated virtual scan line pattern.

As an alternative to embodiments that alter the compensated virtual scan line pattern on the fly, the virtual scan line pattern generator may be pre-configured to generate a compensated virtual scan line pattern comprising virtual scan lines that are defined to approximate a typical type and level of optical distortion associated with the system. For example, a system may be designed for a certain application and use and the typical levels and/or types of distortion experienced under those conditions may be used to pre-configure an appropriate compensated virtual scan line pattern to be programmed into the system.

In some embodiments, a user input device may also be provided that may be coupled with the compensated virtual scan line pattern generator. The user input device may be configured to accept a user selection of at least one of a plurality of different settings, each of the settings corresponding with a different compensated virtual scan line pattern. The different compensated virtual scan line patterns corresponding to the settings selectable by the user input device may, for example, correspond with, and vary in accordance with, an expected distortion at a plurality of different distances between an optical sensor of the system (or another similar component of the system) and an encoded symbol that is to be read by the system. For example, one setting may define a virtual scan line pattern that compensates for distortion expected at scanning distances of only a few centimeters, whereas another setting may define a virtual scan line pattern that compensates for distortion expected at greater scanning distances, such as a few dozen centimeters or more.

Figure 2:
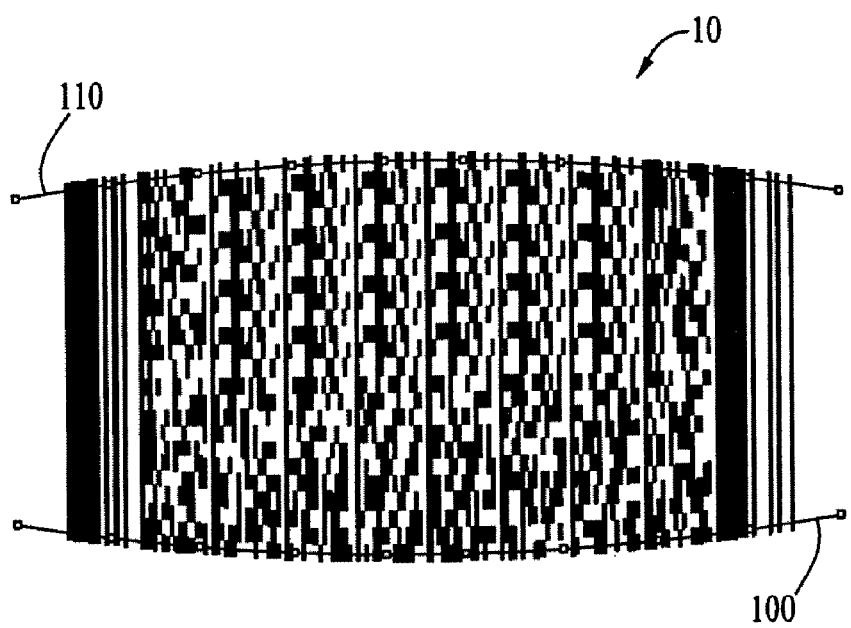
FIG. 2 depicts a distorted image of a bar code and a compensated, curved virtual scan line which at least approximately tracks the curvature of the distortion bar code image.

Other particular embodiments will now be described with reference to the accompanying drawings. With reference now to FIG. 2, an example of an image from an imaging scanner is provided. A bar code 10 is shown in the image. As is apparent from FIG. 2, the image is distorted. More particularly, bar code 10 "bows" towards the center of the image at either end. In other words, whereas the actual bar code that was used to generate the image is in the shape of a rectangle with straight, parallel top and bottom edges, in the image of bar code 10, the top and bottom edges of the image are curved or bowed. More particularly, the top edge of the bar code image 10 bows upward and the bottom edge bows downward.

FIG. 2 also contains two compensated virtual scan lines 100 and 110 of an illustrative compensated virtual scan line pattern. Unlike virtual scan lines 50 and 60 of FIG. 1, virtual scan lines 100 and 110 are curved to at least approximately match the curvature of the bar code associated with the distortion of the imaging system. Of course, although the pattern in FIG. 1 only includes two virtual scan lines, it should be appreciated that imaging scanners incorporating compensated virtual scan lines will typically include a plurality of virtual scan lines extending throughout the pattern. In some embodiments, each of the virtual scan lines in the pattern—or a plurality of subsets of virtual scan lines in the pattern—may have a different curvature. In this manner, the virtual scan lines may be approximated to the curvature of an image associated with image distortion in a way that varies as the level and pattern of distortion varies in an image.

To further illustrate, FIG. 3A depicts an example of a pattern 140 of compensated virtual scan lines. The virtual scan lines depicted in FIG. 3A are curved upward towards the top of the pattern and become gradually less curved until the middle of the pattern, at which point the virtual scan lines are generally straight. Then, continuing from the middle of the pattern to the bottom, the virtual scan lines have a bowed curvature curved in the opposite direction of the upper virtual scan lines. The curvature of these lines also increases as the lines get closer to the bottom of the pattern.

Thus, virtual scan line 150 at the top of the pattern has a relatively high level of curvature and is bowed upward relative to the horizontal. Virtual scan lines 152 and 154, respectively, have decreasing curvatures in the same direction. Virtual scan lines 156 and 158 are approximately straight or horizontal. Virtual scan line 160 is slightly bowed downward relative to the horizontal. Virtual scan line 162 is bowed downward, but more strongly so. Finally, virtual scan line 164 has the highest level of curvature downward relative to the other virtual scan lines in the pattern.

An alternative compensated virtual scan line pattern 240 is shown in FIG. 3B. Pattern 240 comprises a plurality of virtual scan lines, at least a subset of which are "crooked." In other words, instead of bowing or curving the virtual scan lines to at least approximately compensate for optical distortion, at least a subset of the virtual scan lines in FIG. 3B are bent so as to comprise a first section extending in a first direction and a second section extending in a second direction. More particularly, other than the lines in the middle of the pattern, each of the virtual scan lines in the pattern comprises two straight lines which are joined and converge at a common point so as to define an angle therebetween. The segmented virtual scan lines of FIG. 3B may be easier to compute and generate than the curved virtual scan lines of FIG. 3A.

Following the descriptions herein, it should be appreciated that other patterns may be readily conceived in which each virtual scan line comprises more than two sections. In other words, the compensated virtual scan lines may be segmented into many (as many as desired) segments in order to achieve the desired precision and coverage in a virtual scan line pattern.

It should also be noted that pattern 240 of FIG. 3B approximately resembles pattern 140 of FIG. 3A. Accordingly, pattern 240 may be suitable for use in connection with optical systems having the same types and levels of distortion as those for which pattern 140 in FIG. 3A is designed. Similar to pattern 140 of FIG. 3A, the virtual scan lines in pattern 240 of FIG. 3B begin at the top with a virtual scan line 250 that has a center portion which is positioned higher in the FOV than the end portions. More particularly, compensated virtual scan line 250 is made up of a first segment 251 and a second segment 252 which converge at point 253. The angle between the two segments in each virtual scan line in the pattern of FIG. 3B increases until straight virtual scan lines 254 and 256 in the middle region of the pattern. The orientation of the angle between the virtual scan line segments then reverses and the angle between the segments decreases as you move from the middle to the bottom region of the pattern, ending with compensated virtual scan line 264 at the bottom of the pattern.

It should be understood that, although the compensated virtual scan line patterns shown in FIGS. 3A and 3B each comprise two straight, horizontal lines at the center of the pattern, in many embodiments this need not be the case. Instead, in some embodiments, only a single straight, horizontal line may be positioned at the center of the pattern. In other embodiments, each of the virtual scan lines in the pattern may be curved or compensated, such that none of the virtual scan lines in the pattern are straight. In such patterns, the degree of curvature or angling away from horizontal may gradually increase as the lines recede from the vertical center of the pattern.

It should also be understood that numerous varieties of compensated virtual scan line patterns are contemplated. For example, compensated virtual scan lines may each comprise more than two segments converging at more than one point. Some compensated virtual scan line patterns may include virtual scan lines that extend from approximately the top of the field of view to approximately the bottom, somewhat diagonally across the pattern, or otherwise. Other compensated virtual scan line patterns may include both curved compensated virtual scan lines and compensated virtual scan lines comprising a plurality of straight lines converging at one or more points (segmented virtual scan lines). Of course, a series of "families" of virtual scan lines may be included in a single virtual scan line pattern. Some virtual scan line families may be defined by the direction in which they extend. Other families may be defined by the type and/or degree of distortion for which they compensate.

Moreover, some families in a compensated virtual scan line pattern and/or some virtual scan lines within a family need not be configured to compensate for optical distortion. In other words, some patterns may be created that include both compensated and standard—or non-compensated—virtual scan lines or virtual scan line families. Furthermore, it should be noted that, although the examples disclosed herein are presented with reference to barrel distortion, it should be understood that the same principles may be applied to other types of distortion, such as pincushion distortion.

A variety of systems are also contemplated for defining compensated virtual scan lines. For example, in some embodiments, the distortion of an imaging system may be measured. Then, one or more virtual scan lines may be defined by fitting the curvature associated with the measured distortion to a quadratic equation. Alternatively, two or more joined straight lines may be used to make up each of the compensated virtual scan lines, as described above, and the lines may be approximated with the measured distortion. Once the virtual scan line pattern has been defined, the pixel positions in the image may be mapped to the virtual scan lines by using, for example, a pre-calculated table or a line generation algorithm. Data may then be processed for each of the pixels in the virtual scan lines.

The data from the pixels in the image may be dropped in serial fashion into a buffer array, after which the array may be processed by selecting the data points corresponding to the virtual scan line pattern. Alternatively, as the signal is detected, the data points corresponding to the virtual scan lines may be picked off as they arrive and sent directly to the processor for decoding without use of a buffer. As another alternative, the data points corresponding to the virtual scan lines may be picked off as they arrive and placed into smaller virtual scan line buffers, one virtual scan line buffer corresponding to each virtual scan line. As each virtual scan line buffer is completed, that virtual scan line buffer data may be sent to a processor for decoding.

As previously mentioned, in other embodiments, the imaging system distortion may be compensated for without directly measuring the distortion. For example, an expected or typical distortion may be pre-programmed, hard-coded, or otherwise compensated for by creating a compensated virtual scan line pattern that is likely to compensate for the distortion created by the system.

An example of a pixel position algorithm for compensated virtual scan lines will now be discussed in detail with reference to FIG. 4. FIG. 4 depicts an illustrative field of view of an imaging scanner. The field of view contains 752×480 pixels, with a center pixel coordinate of 376, 240. The compensated virtual scan line pattern shown in FIG. 4, for example, may be created by the following pixel position calculation:

$$Y = \Delta Y_i / 376^2 * (X - 376)^2 + Y0_i$$

Other virtual scan line patterns may be created by the same or similar algorithms, as those of ordinary skill will appreciate. In order to generate the values $Y0_i$ and $\Delta Y_i$ for the various virtual scan lines of FIG. 3A, for example, a linear model of parabolic deviation of the virtual scan lines may be assumed, corresponding to linear barrel distortion.

For example, FIG. 3A shows scan lines 150 to 164 equally spaced from each other and the end scan lines (150 and 164) equally spaced from the center of the image. This spacing pattern implies that the deviation ΔY of the top scan line 150 is equal and opposite of the deviation ΔY of the bottom scan line 164, which may be denoted as $\Delta Y_{max}$. Assuming eight virtual scan lines are to be generated, as shown in FIG. 3A, the values of ΔY may change linearly from $-\Delta Y_{max}$ to $+\Delta Y_{max}$. Assuming the index i of virtual scan lines 150 to 164 ranges from i=0 to i=7, the deviation $\Delta Y_i$ may be computed as follows: $\Delta Y_i = -\Delta Y_{max} + 2*\Delta Y_{max}*i/7$. Similarly, the starting position of the virtual scan lines, Y0, may be determined as a linear function due to equal line spacing. Assuming that the starting position $Y0_0$ of the top virtual scan line 150 is $Y0_{top}$ and the starting position $Y0_7$ of the bottom virtual scan line 164 is $Y0_{bottom}$, then the starting position $Y0_i = Y0_{top} + (Y0_{bottom} - Y0_{top})*i/7$. In an analogous fashion, virtual scan lines in the form of those in FIG. 3B may be computed as straight line trajectories starting at $Y0_i$ (the same starting position as in FIG. 3A) and ending at $Y0_i + \Delta Y_i$.

Coordinates for straight virtual scan lines can also be computed using raster-based line drawing algorithms, such as the Bresenham line drawing algorithm. In a similar fashion, coordinates for curved virtual scan lines, such as quadratic virtual scan lines, can be computed with second order difference techniques, as also described by Bresenham.

Figure 5:
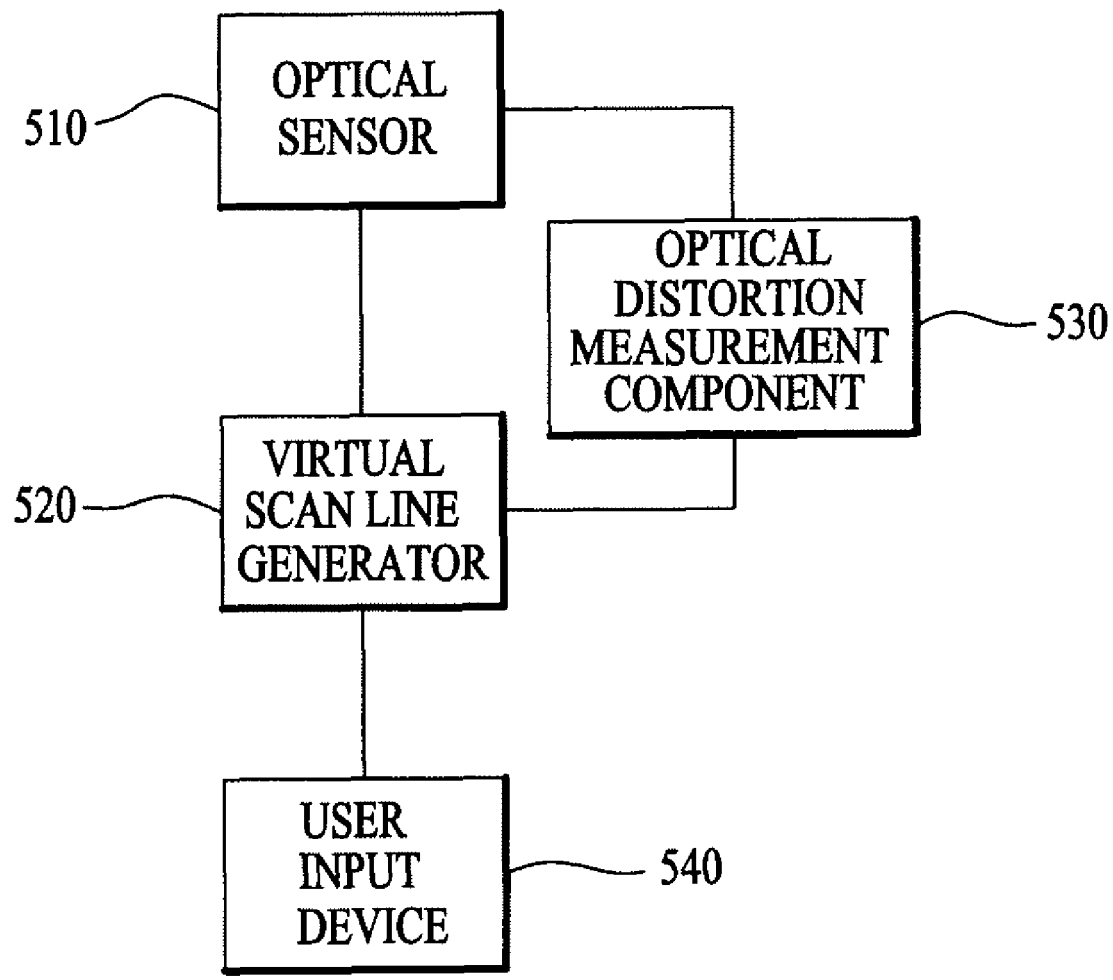
FIG. 5 is a block diagram of one embodiment of a system for measuring optical distortion and generating a virtual scan line pattern to compensate for the optical distortion of the system.

FIG. 5 is a block diagram illustrating one embodiment of a system for measuring optical distortion and generating a virtual scan line pattern to compensate for the optical distortion of the system. As shown in the figure, an optical sensor 510 is provided. Optical sensor 510 is coupled to both a virtual scan line generator 520 and an optical distortion measurement component 530. As those of ordinary skill in the art will appreciate, virtual scan line pattern generator 520 may, for example, comprise a software algorithm implementing the Bresenham line drawing algorithm or a hardware circuit, such as may be implemented in a field programmable gate array (FPGA) that selects pixels to process based on the Bresenham algorithm or another similar algorithm. Similarly, those of ordinary skill in the art will appreciate that optical distortion measurement component 530 may, for example, comprise a software algorithm to compute the locations of the edges of a uniformly spaced bar target when imaged by optical sensor 510. Such an algorithm may be used to compute the best fitting parabolic trajectory through a given set of edges, for example. User input device 540 is also provided, and may be used to allow a user to vary the type of virtual scan line pattern that is generated by virtual scan line pattern generator 520.

For example, user input device 530 may be configured to accept a user selection of at least one of a plurality of different settings, each of the settings corresponding with a different compensated virtual scan line pattern. The different compensated virtual scan line patterns corresponding to the settings selectable by the user input device may, for example, correspond with, and vary in accordance with, an expected distortion at a plurality of different distances between optical sensor 510 and an encoded symbol that is to be imaged by optical sensor 510. For example, one setting may define a virtual scan line pattern that compensates for distortion expected at relatively short scanning distances, whereas other settings may define a virtual scan line pattern that compensates for distortion expected at progressively larger scanning distances. User input device 510 may comprise, for example, one or more switches, buttons, dials, and/or a touch or pen-sensitive user interface screen, for example.

The terms, descriptions, examples, and embodiments used herein are set forth by way of illustration only and are not meant as limitations. Those skilled in the art will recognize that numerous variations and modifications can be made to the details of the above-described embodiments without departing from the underlying principles of the invention. The scope of the invention should therefore be determined only by the claims, and their equivalents.

The invention claimed is:

1. A method for processing data to form a virtual scan line pattern, comprising the steps of:
   generating a compensated virtual scan line pattern to at least partially compensate for distortion in an optical imaging system;
   imaging an encoded symbol with the optical imaging system; and
   processing data from the encoded symbol image corresponding to pixels defined by the compensated virtual scan line pattern.

2. The method of claim 1, wherein the step of processing data comprises storing data from the encoded symbol image corresponding to pixels defined by the compensated virtual scan line pattern.

3. The method of claim 1, wherein the compensated virtual scan line pattern comprises curved virtual scan lines.

4. The method of claim 3, wherein the step of generating a compensated virtual scan line pattern comprises using a quadratic equation to generate a curved virtual scan line.

5. The method of claim 1, wherein the compensated virtual scan line pattern comprises non-curved virtual scan lines.

6. The method of claim 5, wherein the compensated virtual scan line pattern further comprises curved virtual scan lines.

7. The method of claim 1, wherein the compensated virtual scan line pattern comprises a plurality of segmented, non-curved virtual scan lines each comprising at least two segments joined at a common point.

8. The method of claim 7, wherein the compensated virtual scan line pattern further comprises at least one straight, non-segmented virtual scan line.

9. The method of claim 7, wherein each of the segmented, non-curved virtual scan lines comprises two segments joined at a centrally-located common point, and wherein an angle is defined by the intersection of each of the segmented, non-curved virtual scan lines.

10. The method of claim 9, wherein the angle between the segments of the segmented, non-curved virtual scan lines decreases towards top and bottom edges of the encoded symbol image.

11. The method of claim 1, further comprising measuring distortion in the optical imaging system.

12. The method of claim 11, wherein the step of measuring distortion comprises receiving feedback data from the encoded symbol image.

13. The method of claim 12, further comprising altering the virtual scan line pattern in response to the feedback data.

14. A system for reading data from encoded symbols, comprising:
   an optical sensor;
   a virtual scan line pattern generator for defining a compensated virtual scan line pattern, wherein the compensated virtual scan line pattern is configured to at least partially compensate for optical distortion associated with the system; and
   a processing device for processing data received from the optical sensor corresponding to pixels that overlap with the compensated virtual scan line pattern.

15. The system of claim 14, further comprising an optical distortion measurement component configured to measure the optical distortion associated with an image generated from the optical sensor.

16. The system of claim 15, wherein the optical distortion measurement component is further configured to transfer distortion data to the virtual scan line pattern generator, and wherein the distortion data is used by the virtual scan line pattern generator to define the compensated virtual scan line pattern.

17. The system of claim 16, wherein the virtual scan line pattern generator is configured to alter the compensated virtual scan line pattern in response to at least one of the type of distortion and the level of distortion detected by the optical distortion measurement component.

18. The system of claim 14, wherein the virtual scan line pattern generator is pre-configured to generate a compensated virtual scan line pattern comprising virtual scan lines that are defined to approximate a typical type and level of optical distortion associated with the system.

19. The system of claim 18, wherein the virtual scan line pattern generator is configured to generate a compensated virtual scan line pattern by using a quadratic equation to generate curved virtual scan lines.

20. The system of claim 14, further comprising a user input device coupled with the compensated virtual scan line pattern generator, wherein the user input device is configured to accept a user selection of at least one of a plurality of different settings, each of the settings corresponding with a different compensated virtual scan line pattern.

21. The system of claim 20, wherein the different compensated virtual scan line patterns corresponding to the settings selectable by the user input device correspond with, and vary in accordance with, an expected distortion at a plurality of different distances between the optical sensor and an encoded symbol.

22. A method for storing data to form a virtual scan line pattern, comprising the steps of:
    imaging a first encoded symbol with an imaging system;
    measuring the optical distortion associated with the first encoded symbol image;
    defining a first compensated virtual scan line pattern comprising a plurality of virtual scan lines, wherein at least a subset of the first plurality of virtual scan lines comprises compensated virtual scan lines that at least approximate the measured optical distortion of the first encoded symbol image;
    storing data from the first encoded symbol image corresponding to pixels defined by the first virtual scan lines;
    imaging a second encoded symbol with the imaging system;
    measuring the optical distortion associated with the second encoded symbol image;
    defining a second compensated virtual scan line pattern comprising a second plurality of virtual scan lines, wherein at least a subset of the second plurality of virtual scan lines comprises compensated virtual scan lines that at least approximate the measured optical distortion of the second encoded symbol image, and wherein the second plurality of virtual scan lines differs from the first plurality of virtual scan lines;
    storing data from the second encoded symbol image corresponding to pixels defined by the second virtual scan lines.

23. The method of claim 22, wherein at least one of the first and second compensated virtual scan line patterns comprises curved virtual scan lines.

24. The method of claim 23, wherein the steps of defining a first compensated virtual scan line pattern and defining a second compensated virtual scan line pattern comprise using a quadratic equation to generate a curved virtual scan line.

25. The method of claim 22, wherein at least one of the first and second compensated virtual scan line patterns comprises a plurality of non-curved virtual scan lines each comprising at least two segments joined at a common point.

26. The method of claim 25, wherein at least one of the first and second compensated virtual scan line patterns further comprises at least one straight, non-segmented virtual scan line.

27. A system for reading data from encoded symbols, comprising:
    an imaging device;
    a virtual scan line pattern generator for defining a compensated virtual scan line pattern, wherein the compensated virtual scan line pattern comprises virtual scan lines that are defined to approximate a typical type and level of optical distortion associated with the imaging device;
    a storage device for storing data corresponding to pixels that overlap with the compensated virtual scan line pattern.

28. The system of claim 27, wherein the compensated virtual scan line pattern is hard-coded into the system.

29. The system of claim 27, further comprising a user input device coupled with the compensated virtual scan line pattern generator, wherein the user input device is configured to accept a user selection of at least one of a plurality of different settings, each of the settings corresponding with a different compensated virtual scan line pattern.

30. The system of claim 29, wherein the different compensated virtual scan line patterns corresponding to the settings selectable by the user input device correspond with, and vary in accordance with, an expected distortion at a plurality of different distances between a sensor of the imaging device and an encoded symbol.

* * * * *